United States Patent [19]
Bird et al.

[11] Patent Number: 5,197,376
[45] Date of Patent: Mar. 30, 1993

[54] APPARATUS FOR DISPENSING A COOKED FOOD PRODUCT

[75] Inventors: E. Frederick Bird, Verdugo City; Ray N. Dushane, Fullerton, both of Calif.

[73] Assignee: Services Alimentaires, S.A., Geneva, Switzerland

[21] Appl. No.: 583,806

[22] Filed: Sep. 17, 1990

[51] Int. Cl.⁵ ............................................ A47J 37/12
[52] U.S. Cl. ..................................... 99/330; 99/357; 99/407
[58] Field of Search ..................... 99/357, 330, 407; 221/150 A, 150 R; 73/304 C; 340/620; 74/22 A; 100/238, 289, 295; 192/48.2, 48.9; 198/706; 222/235; 239/557, 565, 566

[56] References Cited

U.S. PATENT DOCUMENTS

| | | | |
|---|---|---|---|
| 961,628 | 6/1910 | Martin | 222/235 |
| 1,150,211 | 8/1915 | Lawhead | 99/357 |
| 1,777,269 | 9/1930 | Webber | 221/150 R |
| 2,316,282 | 4/1943 | Pfeil | 83/171 |
| 2,661,240 | 12/1953 | Salomonssen | 239/557 |
| 3,021,224 | 2/1962 | Stagmeier . | |
| 3,039,883 | 6/1962 | Kodras . | |
| 3,063,849 | 11/1962 | Nelson et al. . | |
| 3,282,704 | 11/1966 | Fritzberg . | |
| 3,297,450 | 1/1967 | Loska, Jr. . | |
| 3,338,724 | 8/1967 | Adler et al. . | |
| 3,459,141 | 8/1969 | Keil . | |
| 3,461,821 | 8/1969 | Gallus | 100/238 |
| 3,605,647 | 9/1971 | Beck et al. . | |
| 3,622,355 | 11/1971 | Beck et al. . | |
| 3,716,383 | 2/1973 | Yamamura | 99/353 |
| 3,764,345 | 10/1973 | Beck et al. . | |
| 3,771,937 | 11/1973 | Harmon et al. | 425/161 |
| 3,782,969 | 1/1974 | Beck et al. | 426/145 |
| 3,789,750 | 2/1974 | Beck et al. | 99/536 |
| 3,890,453 | 6/1975 | Harmon et al. | 426/503 |
| 3,968,265 | 7/1976 | Shatila et al. | 426/550 |
| 3,987,210 | 10/1976 | Cremer | 426/550 |
| 4,005,139 | 1/1977 | Kortschot et al. | 426/550 |
| 4,007,292 | 2/1977 | Shatila et al. | 426/637 |
| 4,044,163 | 8/1977 | Shatila et al. | 426/502 |
| 4,058,240 | 11/1977 | Becker | 222/368 |
| 4,060,367 | 11/1977 | Shatila et al. | 425/311 |
| 4,082,855 | 4/1978 | Citti et al. | 426/250 |
| 4,109,012 | 8/1978 | Bates et al. | 426/302 |
| 4,135,542 | 1/1979 | Chisholm | 137/204 |
| 4,149,660 | 4/1979 | Kraus | 222/368 |
| 4,198,437 | 4/1980 | Citti et al. | 426/104 |
| 4,214,514 | 7/1980 | Contino et al. | 99/330 |
| 4,221,842 | 9/1980 | Teft | 426/550 |
| 4,269,113 | 5/1981 | Ishida | 99/407 |
| 4,272,556 | 9/1981 | Shatila et al. | 426/453 |
| 4,293,582 | 10/1981 | Hamann et al. | 426/637 |
| 4,348,950 | 9/1982 | Harris | 100/289 |
| 4,438,683 | 3/1984 | Bartfield | 99/330 |
| 4,450,757 | 5/1984 | Alfio | 99/327 |
| 4,488,478 | 12/1984 | Leeper | 99/330 |
| 4,499,640 | 2/1985 | Brenton | 73/304 C |
| 4,540,588 | 9/1985 | Bartfield | 426/231 |
| 4,553,434 | 11/1985 | Spaargaren | 73/304 |
| 4,637,272 | 1/1987 | Teske | 192/48.9 |
| 4,646,627 | 3/1987 | Bartfield | 99/407 |
| 4,694,742 | 9/1987 | Dover | 99/404 |
| 4,722,267 | 2/1988 | Galockin et al. | 99/357 |
| 4,732,081 | 3/1988 | Sakuma | 99/407 |
| 4,733,560 | 3/1988 | Dam | 73/304 |
| 4,748,902 | 6/1988 | Maurantonio | 99/326 |
| 4,782,698 | 11/1988 | Wilson | 73/304 |
| 4,785,725 | 11/1988 | Tate et al. | 99/330 |
| 4,821,633 | 4/1989 | Ripatonda | 99/357 |
| 4,924,765 | 5/1990 | Pera | 99/470 |
| 4,971,223 | 11/1990 | Falavigna | 99/357 |
| 4,979,435 | 12/1990 | Hayashi | 99/357 |
| 5,018,438 | 5/1991 | Grandi | 99/357 |

FOREIGN PATENT DOCUMENTS 2491031 4/1982 France ................................ 99/407

Primary Examiner—Philip R. Coe
Assistant Examiner—Terrence R. Till
Attorney, Agent, or Firm—Pretty, Schroeder, Brueggemann & Clark

[57] ABSTRACT

An apparatus that dispenses a cooked food product measures out a predetermined quantity of dehydrated food material for a cooking portion, quickly adds liquid to the material to produce a rehydrated food material of uniform consistency, and simultaneously shapes the rehydrated material into desired size and shape pieces, and delivers the pieces to a cooking unit. After the pieces are cooked, they are automatically dispensed from the apparatus and the next portion is prepared.

25 Claims, 10 Drawing Sheets

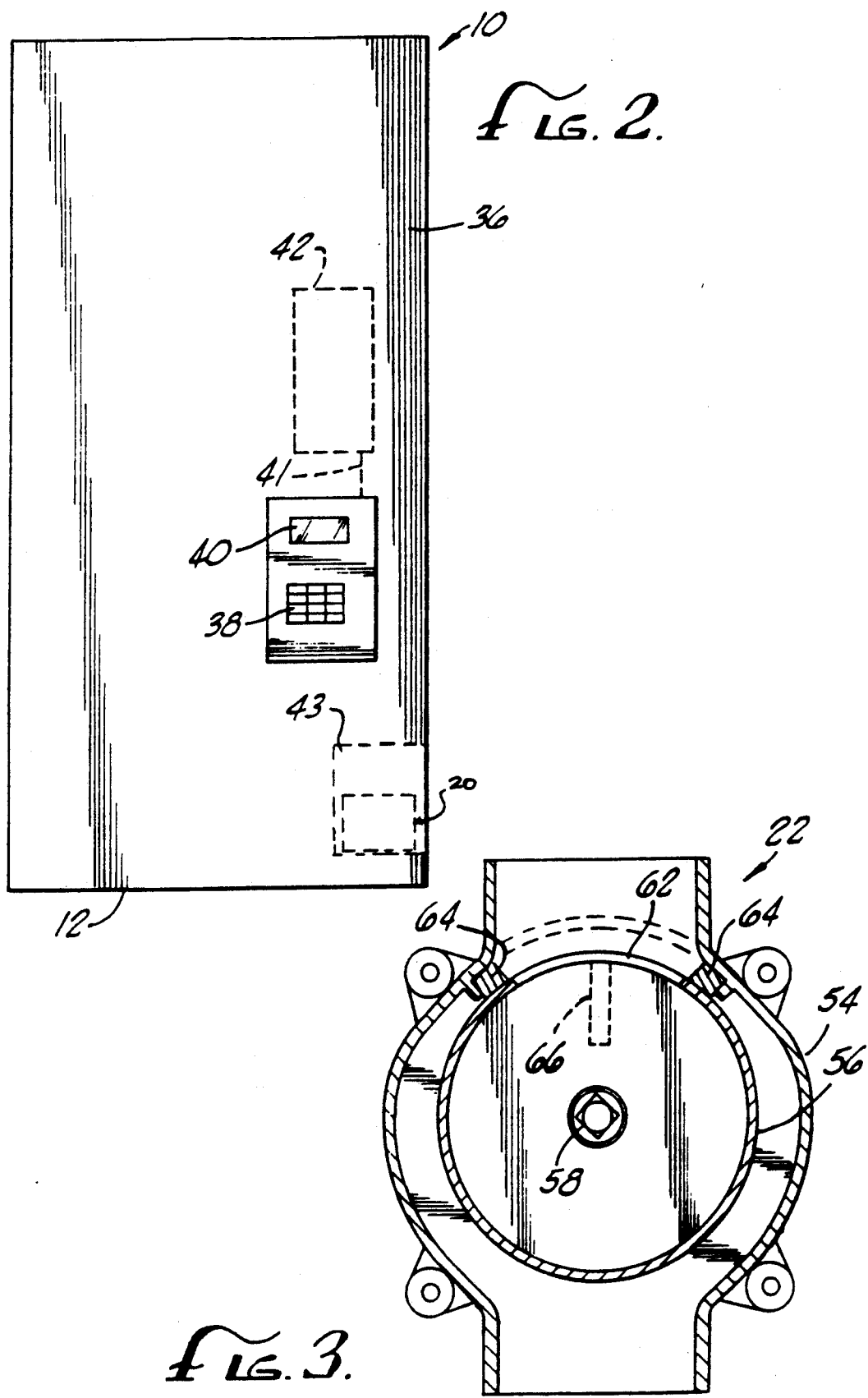

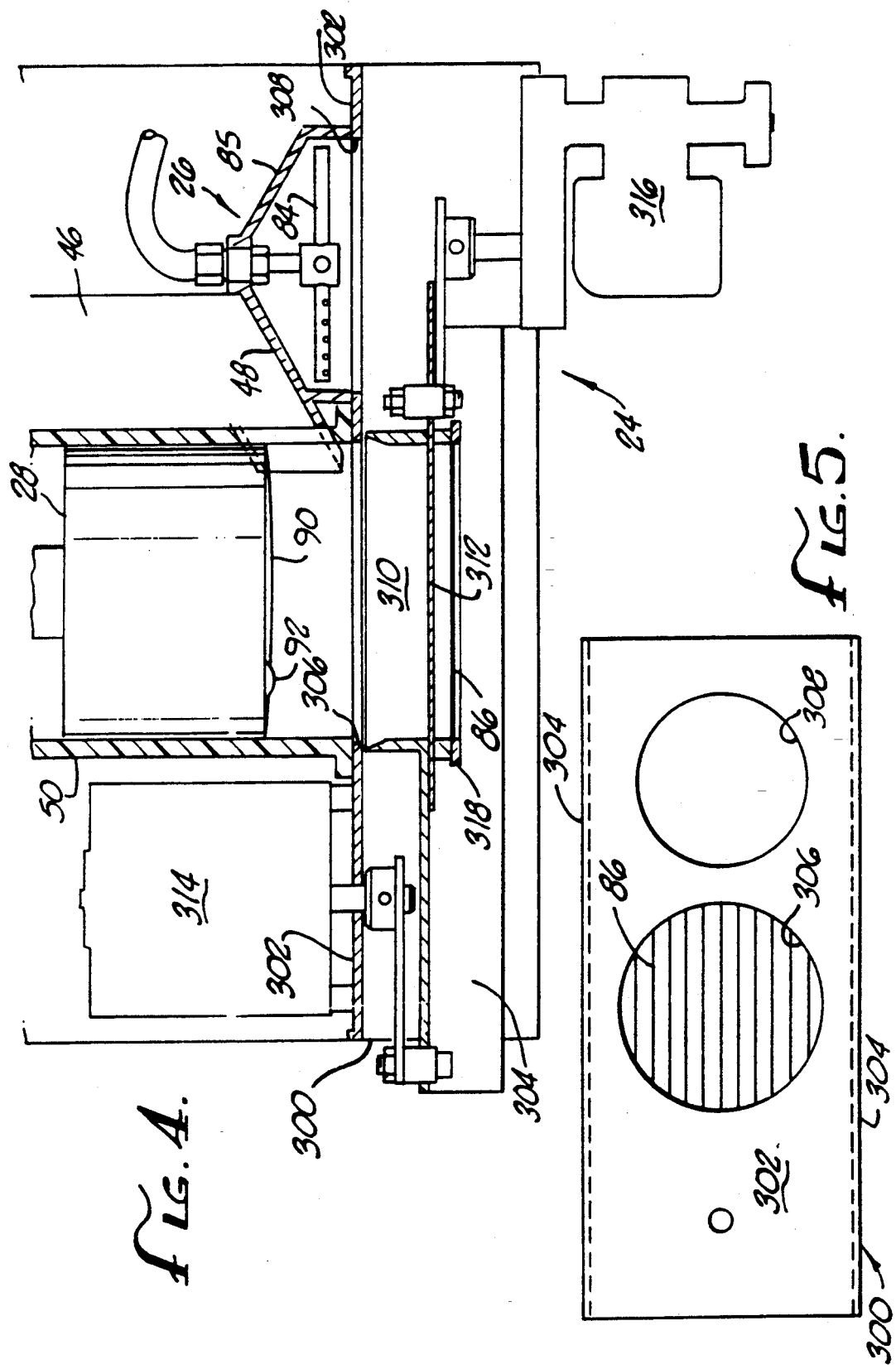

APPARATUS FOR DISPENSING A COOKED FOOD PRODUCT

BACKGROUND OF THE INVENTION

1. Field of the Invention

This invention relates generally to an automatically-controlled cooking apparatus and, more particularly, to a cooking apparatus in which a dehydrated food material is automatically measured out, rehydrated, and formed into desired shapes that are then cooked and dispensed in a serving portion.

2. Description of the Related Art

Many restaurants, particularly those that stress fast food service, require quickly prepared hot food products, often in single-serving portions. In addition, quickly prepared hot food products have become quite popular in a variety of other establishments, such as grocery stores, markets, cafeterias, small businesses, and combination gasoline stations/markets. A variety of devices have been produced to meet the demand for hot food products in these locations. Often, such devices consist of cooked food dispensing machines that utilize a dehydrated food product that is rehydrated, cooked, and then dispensed under automatic control.

Conventional cooked food dispensing machines can suffer from slow cooking time or from an inadequate delivery speed for the cooked food product. This is detrimental because quick preparation of the hot food generally is of paramount importance. Conventional machines can also produce food products of inconsistent quality, frequently because the quantity of dehydrated food material measured out is not carefully controlled or because the rehydration process does not provide a rehydrated mass of uniform consistency. If the quantity of material is not carefully controlled, food pieces of varying sizes and shapes can result, which is undesirable, and which can lead to undercooking or overcooking. If the rehydrated food mass does not have uniform consistency, the cooked product can be lumpy, having pockets of dry food material and pockets of watery material. Another problem is that the finished food products can be of an inconsistent size and shape from serving portion to serving portion, and even within a single serving. Some devices do not provide consistent operation, and can be unreliable and difficult to clean and maintain.

Conventional cooked food dispensing machines can also suffer from various health and safety concerns. For example, health concerns can be raised because the machine can create objectionable cooking odors in its vicinity, and extraneous bits of both cooked and uncooked food product material can accumulate at locations within the machine, creating an environment for the growth of bacteria and pests that could quickly violate applicable health regulations. Safety concerns are raised because some devices can require handling of hot cooking surfaces or materials, or include sharp cutting blades or other dangerous elements that must be handled or cleaned.

Finally, some devices do not provide efficient operation. Such devices might be provided with relatively small supply reservoirs for the dehydrated, raw food material, for the cooking oil, or for the rehydrating liquid. This requires operating personnel to frequently replenish such supplies, taking such persons from other duties and taking the device out of operation during the servicing. Additionally, maintaining the machine in service also requires the utmost in reliability. Lastly, some machines can consume relatively large amounts of rehydrating liquid, cooking oil, or electrical energy, requiring even more frequent replenishing or increasing the operating costs.

From the discussion above, it should be apparent that there is a need for an apparatus that provides quickly prepared hot food products having a uniform size and shape, in convenient serving portions with efficient, reliable operation and without creating objectionable odors, while meeting applicable health and safety regulations. The present invention satisfies this need.

SUMMARY OF THE INVENTION

The present invention is embodied in an apparatus that is enclosed in a cabinet and dispenses single serving portions of a cooked food product, and that measures out a predetermined quantity of dehydrated food material, quickly adds liquid to the material to produce a rehydrated food material of uniform consistency, and simultaneously forms the rehydrated material into pieces having the desired size and shape while it delivers the pieces to a cooking area. The cooked food product pieces are automatically dispensed from the apparatus in a serving container.

The dehydrated food material is stored in a reservoir with a large enough volume to obviate the need for frequent replenishment. When the material is measured out, a precise amount of the food material is loaded into a hopper or holding cup, and a controlled amount of rehydrating liquid is added, producing a rehydrated food material, or dough. The amount of the liquid added to the dehydrated food material is controlled to be enough that rehydration takes place quickly, without excess, while providing the desired uniform consistency. This results in food material pieces of the correct size and texture. When the food material is formed, it is forced from the holding cup into a transporting means, and in doing so is simultaneously made into pieces having the desired sizes and shapes.

The transporting means takes the pieces to the cooking area and then automatically dispenses them from the device. While one group of food pieces is being cooked and dispensed, the apparatus advantageously also loads another amount of dehydrated food material, rehydrates it, and forms it into pieces for cooking. That is, cooked food products are prepared somewhat in parallel, so that a first batch of food product can be prepared simultaneously while a second batch is being prepared. This improves the efficiency of the apparatus and increases the speed of delivery. The first batch and second batch preferably make up a single serving portion together. To control cooking odors, an electrostatic filter draws air from the cooking area and cleans it of airborne particles using ionization techniques before exhausting it to the outside environment. This substantially eliminates cooking odors.

As the food material is deposited into the holding cup, rehydrated, and then forced from the holding cup into the transporting means, substantially no extraneous bits of material are left behind in the apparatus, thereby effectively eliminating accumulated food material as a health concern. All of the moving parts are located within a cabinet of the apparatus and operate without intervention by the operator during any part of the cooking process, thereby increasing the safety of operation. The device advantageously operates without using sharp cutting blades or sharp instruments to shape the pieces. Precise amounts of food material and liquid are metered during the rehydration operation, ensuring efficient use of supplies. Finally, where possible, elements are used to perform more than one function, thereby improving the efficiency of operation throughout the apparatus.

In one aspect of the invention, the holding cup advantageously comprises a dough ring with a sliding bottom panel that is placed beneath the ring and is kept in place during loading and rehydration. Both the dough ring and the bottom panel slide longitudinally within a forming assembly housing. The dough ring and sliding panel are first located at a loading station and then are moved together as a fixed combination to a rehydration station. Initially, at the loading station, a predetermined amount of dehydrated food material is loaded into the dough ring and held there by the sliding panel. The ring and panel combination are then transported, fixed relative to each other, to the rehydration station, where a multiple-armed rotating shower head quickly and uniformly rehydrates the food material.

After rehydration, the food mass or dough is ready to be formed, and the dough ring and sliding panel therefore are moved to the forming station, which can be at the original loading station. The forming assembly housing advantageously includes cutting lines stretched across a housing base, with a circular opening that is aligned with the dough ring. At the forming station, the sliding bottom panel is moved away from the dough ring, exposing the food material in the ring to the cutting lines. A piston conveniently forces the rehydrated food material past the cutting lines in the base and out of the ring, such that the material is formed into the desired sizes and shapes as the piston is advanced. The transporting means advantageously includes a conveyor belt located beneath the cutting lines of the base such that the rehydrated pieces fall onto the conveyor as the piston forms the material into pieces. The conveyor carries the pieces to a transport basket that is then immersed into a deep fryer for a predetermined cooking interval. After the cooking interval, the basket is removed from the fryer and its contents are automatically dispensed from the apparatus.

It has been found that a heated liquid provides optimal rehydration in terms of quickness and uniformity of rehydration. Therefore, the apparatus advantageously includes a hot water heater that heats the rehydration water before it is delivered to the rehydration station. To maximize coverage of the food material, the rehydration station advantageously comprises a rotating shower head with a plurality of spray nozzles. In a further aspect of the invention, a fan is provided to blow air over the hot water heater. The air becomes heated and is then directed toward the areas of the apparatus where rehydration liquid might otherwise collect, and therefore where the dehydrated food material otherwise could become somewhat moist and could accumulate outside of the dough ring. Such accumulated moisture and food material is preferably avoided because it could create an environment in which bacteria can grow, creating a potential health problem. The heated air maintains such areas in a dry condition, thereby minimizing any tendency for the material to moisten and collect. This reduces health and sanitation problems, and using the hot water heater to provide the hot air is more efficient than providing a separate air heater.

Rehydration has also been found to be improved when the dehydrated food material is placed in a compact, level arrangement prior to the addition of the rehydrating liquid. That is, the dehydrated food material should have a uniform volume without peaks and valleys. Therefore, the piston that forces the rehydrated material from the holding cup is also used to level, and optionally to compress, the food material while it is in the ring/panel holding cup combination, prior to rehydration. During this leveling process, the piston is lowered by a predetermined amount and then rotated. This advantageously provides a mass of food material with a uniform thickness, which makes for quick and homogeneous rehydration. Using the piston both for leveling and for forcing the material from the dough ring allows greater efficiency to be achieved when compared to using separate mechanisms for the functions.

In yet another aspect of the invention, the apparatus includes a dispensing means that automatically empties the transporting basket upon its departure from the cooking area. After the shaped pieces are formed by the cutting lines of the housing base, the transporting basket takes the pieces through a cooking area comprising a deep fryer. After a predetermined cooking time, the basket is pulled out of the fryer and the dispensing means empties the basket. The basket then continues on to a position beneath the base, ready to receive the next group of pieces that are forced out by the piston.

The deep fryer advantageously includes a metallic cooking tank filled with heated cooking oil, into which the formed pieces are placed for cooking, and the level of oil in the cooking tank is monitored by a capacitance-type level sensor, in which a wall of the tank forms one capacitor plate and a horizontally oriented metal strip forms the other capacitor plate. The electrical capacitance between the two plates varies according to the level of oil between them. When the capacitance indicates that the oil level is below the level of the sensor, and therefore too low for proper cooking operation, additional cooking oil can be added. To accurately indicate the oil level in the cooking tank, oil must not be allowed to linger on the horizontal strip as the oil level falls. Therefore, the strip is advantageously provided with a sawtooth-like bottom edge to facilitate oil drainage from the strip.

The reservoir containing the dehydrated food product material advantageously includes an agitator arm that periodically stirs up the material so that the material does not cake together, but rather remains crumbled and flows easily from the reservoir. This improves the effectiveness of the metering apparatus. In addition to a holding cup that slides between loading and rehydrating positions, the holding cup can also include a multiple set of cups, arranged in a circular pattern. The cups are rotated and thereby moved from stations for simultaneously moved among the stations. This can increase the speed of operation and the frequency of delivering cooked food product.

Where a large quantity of cooked food products are needed, the holding cup can be embodied in a carousel-type arrangement in which several holding cups are placed on a carousel in a circular configuration and the carousel is rotated, moving the cups from the various process stations. Each of the cups is involved in one of the processes while the other cups are involved in the other processes. If three cups are provided, the processes of loading, rehydrating, and forming the material can occur simultaneously. If four cups are provided, the processes of loading, leveling/compressing, rehydrating, and forming can occur simultaneously. The formed pieces can then be cooked and dispensed as described above. Use of the carousel can increase the frequency of delivering cooked food products.

Additional aspects of the invention can be embodied in an auger-type arrangement, in which the dehydrated food material is loaded into a hopper, into which rehydrating liquid is added, and which includes an auger for mixing the material and liquid, thereby rehydrating the material into a dough, and then extruding the dough. A cutting device is used for cutting the extruded dough into pieces having the desired sizes and shapes. The cooking of the pieces can then follow the configuration described above.

Other features and advantages of the present invention should be apparent from the following description of the preferred embodiments, which illustrates, by way of example, the principles of the invention.

BRIEF DESCRIPTION OF THE DRAWINGS

FIG. 2 is a left side elevational view of the cooking apparatus of FIG. 1.

FIG. 3 is a detailed cross-sectional view of the metering apparatus shown in FIG. 1.

FIG. 4 is a detailed front elevational view of the forming assembly of the apparatus shown in FIG. 1.

FIG. 5 is a top plan view of the forming assembly of the apparatus shown in FIG. 1.

DESCRIPTION OF THE PREFERRED EMBODIMENTS

The following description of the present invention is not to be taken in a limiting sense, but is made merely for the purpose of illustrating the general principles of the invention. The following detailed description is of the best presently contemplated modes of carrying out the present invention.

Figure 1:
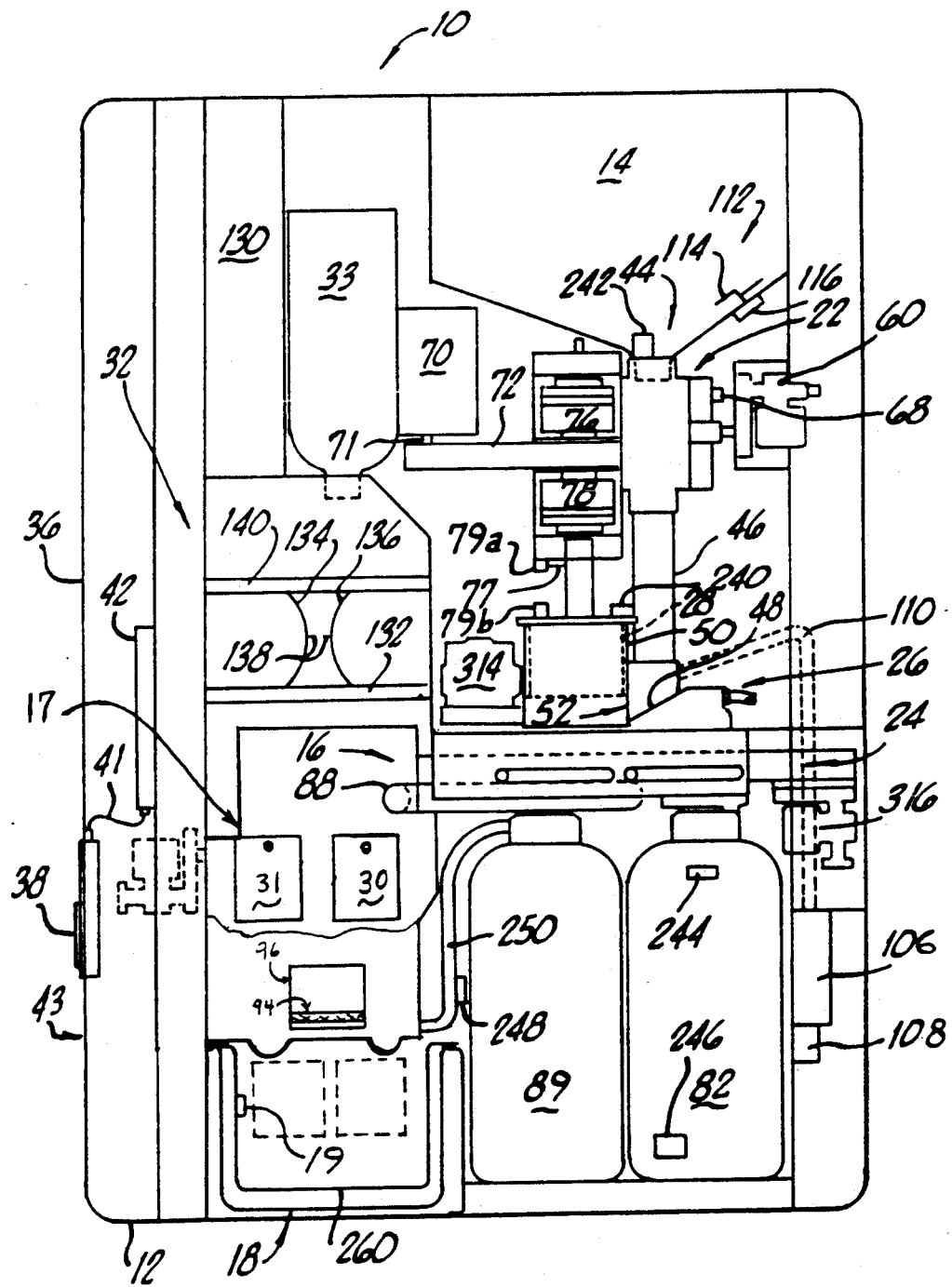
FIG. 1 is a front elevational view of a cooking apparatus embodying the invention, with the front panel of its cabinet removed.

In FIG. 1, a hot food product dispensing apparatus 10 has a front panel of its cabinet 12 removed, showing that it is a device that meters dehydrated food material (e.g., potatoes) from a reservoir 14, rehydrates the material, moves the rehydrated material via a conveyor system 16 to a deep fryer 18, and then delivers the cooked food product to a serving container 20 at the side of the cabinet. It is important for devices of this type to provide quick, efficient service with a minimum of down time for servicing. Such devices also should provide a food product of consistent quality, including proper size, shape, texture, and consistency. Finally, such devices should be free of health and safety concerns, being easy to maintain and operate, and not allowing extraneous moisture and food material to accumulate and promote bacteria growth, while meeting all applicable health regulations.

The apparatus 10 illustrated in FIG. 1 operates efficiently and safely, with a minimum of intervention by an operator, and provides a food product having a uniform consistency, texture, and size. The reservoir 14 advantageously holds enough dehydrated food material for a large number of orders, and therefore does not require frequent servicing. A metering unit 22 of the device precisely measures out the dehydrated food material from the reservoir 14 into a forming assembly 24, where the material is formed into a compressed and leveled volume. The food material is then moved to the site of a shower assembly 26, and a rehydrating liquid is added such that a rehydrated mass of uniform consistency is produced.

The rehydrated mass is then simultaneously forced from the assembly 24, formed into food pieces having the desired size and shape, and placed on the conveyor unit 16 by a piston 28. The conveyor deposits the food pieces into a food basket 30 for delivery to the deep fryer 18. Excess moisture from the rehydration operation is controlled within the cabinet 12 by precisely controlling the amount of liquid dispensed and by shrouding the shower head, thereby minimizing the opportunity for extraneous moisture and food material to collect and cause health and pest problems. Cooking odors are controlled by an electrostatic filter system 32. A fire extinguisher 33 is automatically activated if the temperature in the cooking area around the deep fryer 18 exceeds a predetermined maximum.

The FIG. 2 exterior view of the cabinet 12 is of the side adjacent that illustrated in FIG. 1, and shows the user panel 36 that an operator uses to initiate operation of the apparatus. The user panel includes a keypad 38 and a liquid crystal display (LCD) screen 40. A user enters access information, such as an identification code, and order quantity information via the keypad. Confirming information, or necessary instructions and diagnostic communication, is displayed on the LCD screen. The keypad is connected by a cable 41 to a device controller 42 (shown in phantom in FIG. 2) comprising a microprocessor and associated circuitry, which is used to control the various operations of the apparatus. Also shown in FIG. 2 is the serving container 20, located in a serving port 43 of the cabinet 12.

Further details of the device's operation are best understood with reference again to FIG. 1. The bottom of the reservoir 14 narrows into an opening 44 that is connected to the metering unit 22. The metering unit responds to signals from the controller 42 to meter out a predetermined amount of food material from the reservoir and empty it into a down tube 46. The down tube empties into an angled material delivery ramp 48 that in turn empties into a hollow receiving cylinder 50. The cylinder is only slightly larger in diameter than the piston 28 so a minimum amount of water and food material squeezes past it during the forming of food pieces.

The cylinder also includes an opening or port 52 that communicates with the material delivery ramp. The cylinder is preferably constructed from a hard, clear plastic. Using a hard, clear plastic for the cylinder improves its durability and allows its interior to be easily checked for cleanliness and piston position.

The metering unit 22 comprises a housing 54 illustrated in FIG. 3 that contains an open drum or cylinder 56 attached to the rotating shaft 58 of a metering motor 60 (FIG. 1). An opening 62 in the drum is ordinarily oriented upwardly, to accept dehydrated food material from the reservoir 14. The internal volume of the drum is equal to the volume of dehydrated food material required for one batch of cooked food product. When product is ordered via the keypad 38, the open drum is rotated 360 degrees by the motor, under command from the controller 42, moving the drum opening through a downward position that empties the contents of the drum into the down tube 46 and back to the upwardly oriented position to once again place the opening 62 at the top, in communication with the reservoir opening 44. The drum is therefore filled again with dehydrated food material and is ready for processing the next batch. Wipers 64 fixed between the housing 54 and the drum 56 ensure that food material from the reservoir 14 cannot flow around the drum and into the down tube 46. Thus, each rotation of the drum meters a precise amount of material into the down tube.

One end of the drum 56 is advantageously provided with an index mark 66 that can be detected by an optical detector 68 (FIG. 1). In this way, the controller 42 can be aware of the position of the drum and stop the motor action at the proper times to ensure that only one complete revolution of the drum occurs for each cycle. The complete cycle of emptying and loading, or one complete revolution of the drum, takes about three seconds.

The loading operation is best understood with reference to FIGS. 4 and 5, which show detailed elevational and plan views, respectively, of the forming assembly 24. The forming assembly includes a housing 300 having a raised upper surface 302 and side panels 304. The upper surface includes two circular holes, a piston hole 306 and a shower hole 308. A dough ring 310 and a sliding panel 312 move longitudinally within the housing, with the panel sliding beneath the dough ring. The dough ring moves longitudinally via a ring motor 314, while the panel is moved via a panel motor 316. The dough ring and panel can be coupled to their respective motors by a simple cam or rack and pinion arrangement. Both motors are operated under command of the controller 42 and provide smooth reciprocating movement of the ring and panel, both in unison and independently.

When the dough ring 310 and panel 312 are in a relatively fixed loading position, they are located beneath the receiving cylinder 50, aligned with the piston hole 306. In this position, food material dropped into the receiving cylinder will fall into the dough ring and will stay there, supported by the panel. In particular, when dehydrated food material is metered from the reservoir 14 by the metering unit 22 down through the material delivery ramp 48, the material falls through the hollow receiving cylinder 50 and into the ring and panel combination. At the loading step, the piston 28 is in a raised position to allow all of the food material to move freely on the delivery ramp to the receiving cylinder.

The piston 28 next prepares the dehydrated food material for the rehydration step. Rehydration is improved if the food material is shaped into a uniform volume. Therefore, the piston is lowered in the receiving cylinder 50 onto the dehydrated material and is then rotated about its vertical axis for a predetermined time interval, such as one-half second. The rotation levels the material into a uniform depth. The lowering of the piston can be a timed operation, or can be regulated by optical detector units described further below. Under some conditions, the speed and uniformity of rehydration can be helped if the material is compressed beforehand. In such cases, the piston is advantageously lowered and then pressed onto the dehydrated material, to compress the material before water is added. The top inside rim of the dough ring 310 is beveled to assist in centering the piston in its downward travel.

Figure 6:
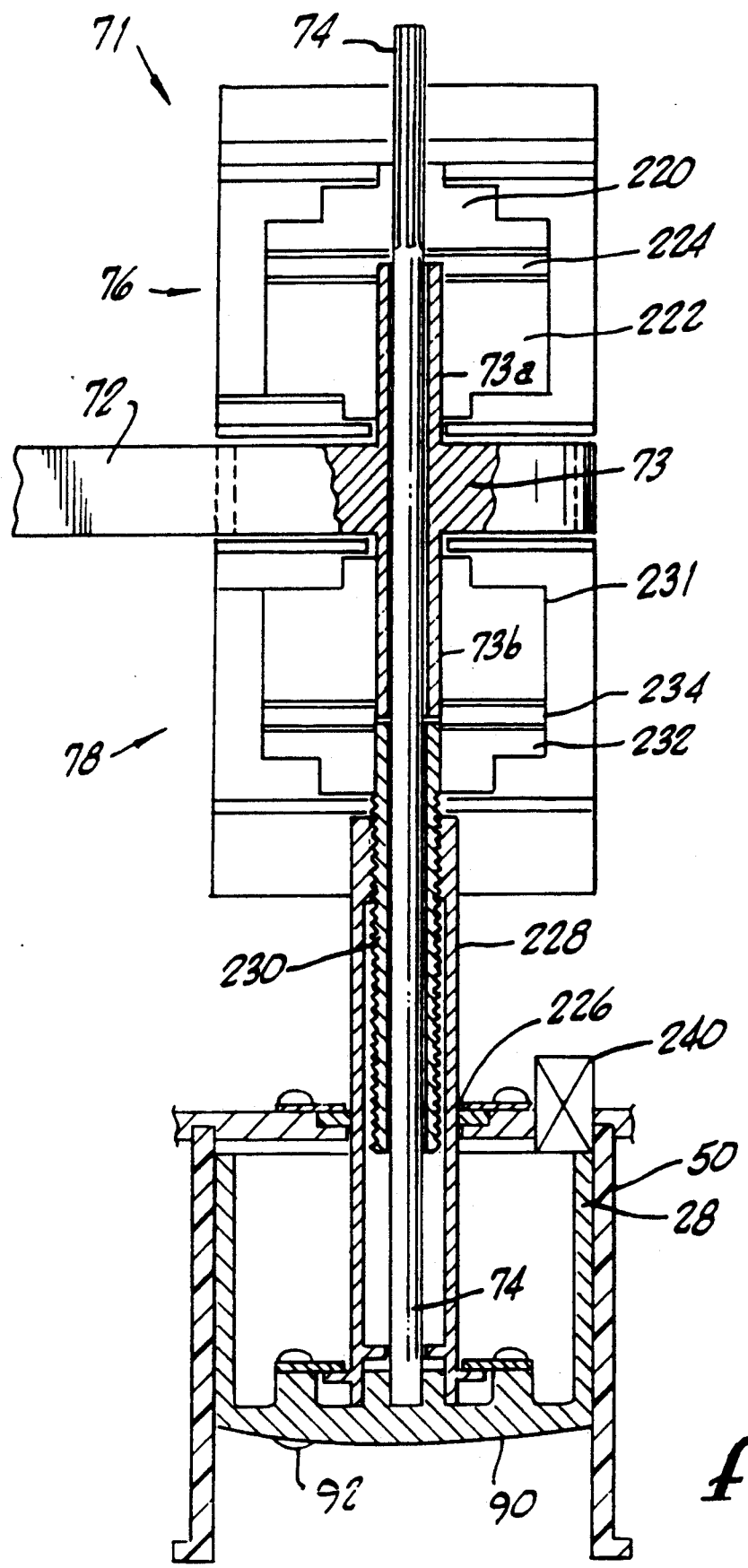
FIG. 6 is a front elevational view of the piston and drive clutch assembly of the apparatus shown in FIG. 1.

With reference again to FIG. 1, and to the detailed illustration of FIG. 6, the combined vertical movement and rotary motion of the piston 28 is achieved through a motor 70 and a combination spin drive and vertical drive clutch assembly. The motor includes a toothed pulley wheel 71 that is coupled to a toothed belt 72, which in turn engages a toothed piston pulley wheel 73 having axially extending shafts 73a and 73b. When rotary motion of the piston is desired, the spin drive clutch assembly 76 is engaged, and when vertical motion of the piston is desired, the vertical drive clutch assembly 78 is engaged.

A piston shaft 74 is coupled at its lower end to the piston 28, and extends through the piston pulley wheel 73 to rotate freely. The piston shaft is coupled to an armature 220 of the spin drive clutch assembly 76 so that the two rotate together, independently of the piston pulley wheel. When the spin drive clutch assembly is engaged, a coil assembly 222 pulls the armature into engagement with a rotor 224 attached to the pulley wheel, effectively coupling the piston shaft 74 and the pulley wheel together. This causes the piston shaft and pulley wheel to rotate together with movement of the belt 72, causing the piston to rotate.

When vertical movement of the piston 28 is desired, the spin drive clutch assembly 76 is disengaged, allowing the pulley wheel 73 to rotate independently of the piston shaft 74, and the vertical drive clutch assembly 78 is engaged. The top of the receiving cylinder 50 includes a square opening 226 through which a square keyed shaft or nut 228 passes, the square key preventing rotational movement of the nut. The nut is internally threaded, and engages a lead screw 230 that is coupled to an armature 232 of the vertical drive clutch assembly. The vertical drive armature ordinarily does not rotate with the piston shaft 74. When the clutch assembly is engaged, a coil assembly 232 pulls the armature into engagement with a rotor 234 attached to the pulley wheel 73, effectively coupling the lead screw to the pulley wheel. When the belt 72 is moved, the lead screw will rotate, thus threading the lead screw 230 into the nut 228 and therefore raising and lowering the piston. Thus, rotary motion of the pulley wheel results in vertical movement of the piston.

Referring back to FIG. 1, after the piston 28 has completed its leveling of the dehydrated food material, the piston is raised up out of the forming assembly 24, and the dough ring 310 and panel 312 are moved along in the assembly housing 300 into position for rehydration. Vertical movement of the piston is controlled by an index tab 77 on the piston shaft, in conjunction with infrared emitter/detector combinations 79a and 79b that signal the controller 42 when the piston has reached positions specified by appropriately locating the detectors 79. In particular, an infrared emitter produces a beam of infrared light that is received by a detector. When the index tab 77 mounted to the piston shaft 74 breaks the infrared beam received by a first detector 79a, the controller is effectively informed of the piston being in the raised position. When the tab breaks the beam received by a second detector 79b, the controller is effectively informed that the piston has reached a lowered position.

Quick and consistently uniform rehydration is important in delivering a cooked food product of high quality. Therefore, the apparatus provides rehydration that quickly and efficiently distributes the rehydration liquid, such as water, evenly over the entire leveled mass of food material. For rehydration, the dough ring 310 and sliding panel 312 are moved into a position beneath the shower hole 308 in the housing upper surface 302. The piston hole 306 has a diameter slightly larger than that of the dough ring. The rehydrating water is sprayed from a shower assembly 26 through the shower hole onto the food material, quickly and efficiently rehydrating it. The shower hole 308 has a diameter sufficient for the water from the shower assembly to cover all of the food material, as described further below.

Figure 7:
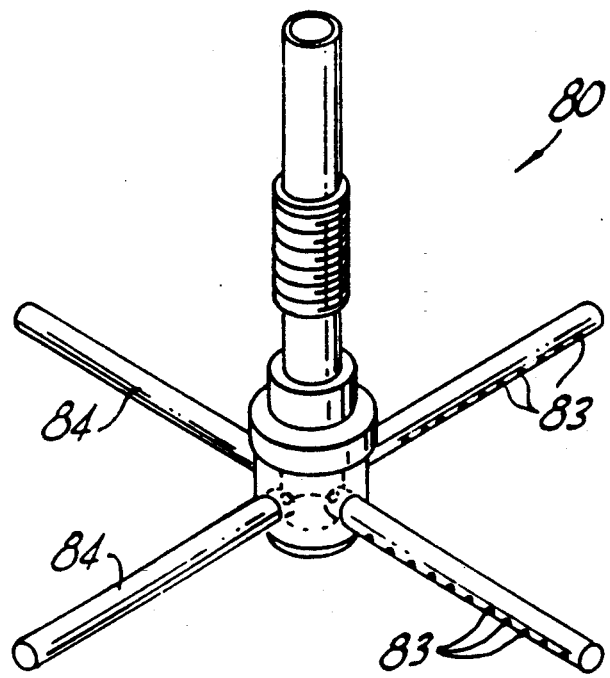
FIG. 7 is a detailed perspective view of the shower head assembly of the apparatus shown in FIG. 1.

The rehydration shower assembly 26 includes a multiple-armed shower head 80, illustrated in FIG. 7, which receives water under pressure from a water storage tank 82 and which sprays the water out of nozzles 83 on its arms 84. The multiple arms allow simultaneous wetting of an increased area of the food material, and the nozzles further increase the coverage area. The assembly 26 advantageously includes directed jetting via the nozzles so that water pressure causes the shower head to rotate. Rotation of the shower head ensures uniform dispensing of the water throughout the food product material, and ensures uniform and consistent rehydration. The shower head advantageously rotates within a shroud 85 to more precisely control the distribution of water sprayed onto the food material and to reduce the chance that any extraneous water will reach another part of the apparatus, which could mix with food material and create a sanitation problem.

Prior to any further operations on the food material, approximately four to five idle seconds are allowed to elapse, for more complete rehydration. The rehydrated material is then in suitable condition for the forming operation. After the rehydration has been completed, the dough ring 310 and panel 312 combination are returned by their respective motors to their initial position beneath the piston 28, for the step of forming. The panel 312, which has remained in a closed position during loading and rehydration, is first moved away by the panel motor 316. This exposes the rehydrated material to a base plate 318 in the forming assembly 24, the base plate comprising a panel with a circular opening of approximately the same diameter as the dough ring, located beneath the piston hole 306 and panel. Stretched across the base plate opening are a plurality of parallel, uniformly-spaced cutting lines 86. When the panel is moved away, the rehydrated mass has a sufficiently thick consistency that it remains in place within the dough ring 310. After the panel is moved, the piston 28 is again lowered into the cylinder 50 onto the food material and is then lowered further, down into the dough ring.

As the piston 28 is lowered into the ring 310, the rehydrated food material is forced past the cutting lines 86, thereby forming the rehydrated material into pieces having the desired sizes and shapes. The cutting lines need not be sharp and can comprise, for example, nylon line spaced approximately ¼ inch apart. The lines can also be metal, but because rehydrated material sticks readily to metal, any metal cutting wires should be coated to reduce sticking. As the rehydrated material is forced past the cutting lines, the pieces fall approximately ¼ inch onto a conveyor belt 88 that moves the pieces off its end and into the cooking basket 30, located beneath the conveyor belt. Preferably, the cutting lines are oriented parallel to the conveyor's direction of travel, although other orientations might alternatively be used. The orientation is preferably selected to provide an optimum separation of the formed pieces at the end of the conveyor, and can depend on the nature of the dehydrated material. The conveyor 88 should be at least as wide as the dough ring 310 diameter, to catch all the pieces as they are formed.

After receiving the formed pieces from the conveyor 88, the cooking basket 30 is transported into the deep fryer 18, which is filled with cooking oil dispensed from an oil storage tank 89. The cooking oil is heated to a cooking temperature that varies depending on the dehydrated food material, but typically is in the range of 350 to 400 degrees Fahrenheit. In the case of food material comprising dehydrated potatoes, for example, the cooking temperature has been found to be approximately 350 degrees Fahrenheit. The basket and its contents are immersed in the oil for a predetermined cooking time that varies according to the size of the food pieces and the temperature of the cooking oil, typically requiring approximately one-half minute. After the pieces are cooked, they are removed from the deep fryer.

The temperature of the cooking oil and the cooking time can be controlled by the controller 42. The deep fryer 18 can include a thermocouple 19 immersed in the cooking oil, providing a temperature signal to the controller. The controller can cause heating of the oil to begin when the temperature reaches a predetermined minimum, and can cause heating to cease when the temperature reaches a predetermined maximum. The heating can be accomplished by a conventional resistive heater element immersed in the deep fryer.

The cooking time can be controlled by the controller 42 in conjunction with cooking oil temperature data received from the thermocouple 19. When the cooking oil temperature is in the low end of its range, the controller extends the cooking time, and when the temperature is in the high end, shortens the cooking time. The cooking time can be determined by the controller using a time function dependent on the cooking oil temperature, or can be determined using look-up tables.

Figure 8:
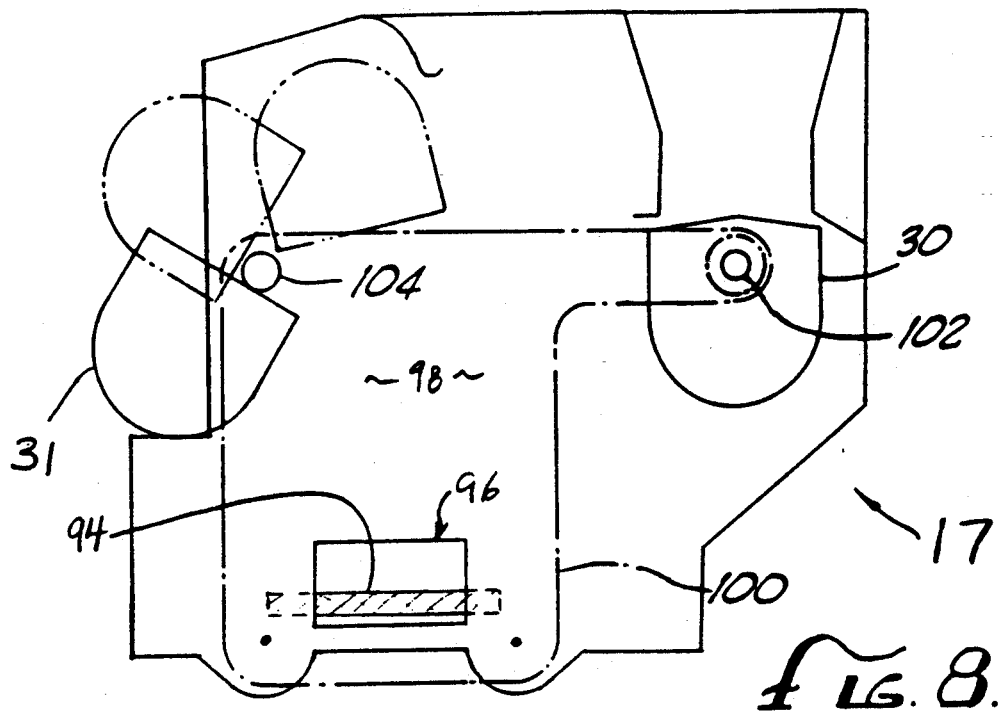
FIG. 8 is a side view of the transporting basket assembly shown in the apparatus of FIG. 1.

When the cooking basket 30 is removed from the oil, its contents are delivered to the container 20 by a chain transport system 94 (best illustrated in FIG. 8) and a delivery ramp 96, where the cooking basket is automatically overturned. When the contents of the cooking basket are emptied onto the ramp, they are delivered automatically to the serving container. The cooking basket is actually one of a pair that operate in concert. As shown in FIG. 8, both the first basket 30 and a second basket 31 are suspended from a transport chain 100, spaced equally apart on the chain in a ferris wheel-like arrangement. The baskets are not shown in their proper relative positions in FIG. 8 to better illustrate the emptying function, described further below. A transport motor (not illustrated) drives a sprocket 102 that engages the chain and moves it along a transport path. In FIG. 8, the transport path is perpendicular to the direction of travel of the conveyor 88, but could also be oriented to move the baskets along the same direction. When the first basket is located beneath the end of the conveyor belt 88, the second basket is located in the deep fryer 18, which is filled with heated cooking oil. Thus, the second basket and its contents are immersed in the cooking oil while the first basket is receiving its food pieces.

Thus, the apparatus 10 precisely meters out dehydrated food material into a dough ring/panel combination that are reciprocally moved to a shower head for rehydration and then returned to a forming station where the product is pressed out of the ring onto a conveyor belt and into cooking baskets. Further details of the apparatus, as well as alternate embodiments, will next be discussed.

When the piston 28 is lowered down into the dough ring 310 to force out the rehydrated material, the piston 28 is lowered until it completely passes through substantially all of the dough ring and makes contact with the cutting lines 86. The piston then undergoes a transverse or lateral movement relative to the cutting lines, to help dislodge the food pieces. Preferably, the piston is rotated by the motor 70 and clutch assembly 76, 78 combination for a predetermined time interval, thus using the same structure for the forming of rehydrated material as was used for the leveling and compressing of dehydrated material.

To better force the rehydrated material past the cutting lines 86, the bottom of the piston 28 is provided with a dome, or convex surface 90 (FIG. 4). As the rehydrated material is pushed out the dough ring 310, the cutting lines are bowed outwardly by the downward force of the material. The convex bottom surface of the piston approximately matches this bowing, ensuring complete passage of the entire rehydrated mass past the cutting lines such that no extraneous matter is left behind. This improves the cleanliness and efficiency of the forming operation, as all of the material is used and none is left to sit and create an environment for the growth of bacteria.

In addition, a small raised button 92 on the domed face 90 of the piston 28 is provided, the button having a height of approximately 0.030 inches. When the piston has been fully pressed into the dough ring 310 and against the cutting lines 86, the piston is rotated through a predetermined time interval, such as about one second, which is sufficient for several revolutions of the piston. As the piston is rotated, the raised button makes contact with each of the cutting lines, essentially plucking them. This dislodges any food material pieces that might otherwise remain within the dough ring or in some way might stay attached to the cutting lines. Again, this increases cleanliness and efficiency.

To further improve the dislodging of pieces from the cutting lines 86, the lines can be heated. This cauterizes the pieces as they are formed, and discourages them from sticking to the lines and to each other. The lines can be constructed from a heat conductive material, to be heated from an external heat source, or the lines themselves can generate heat. If the lines are to generate heat, they can advantageously be formed from nickel chromium wire, which has good resistivity and is commonly used in heating applications. Nickel chromium wires efficiently generate heat when an electrical current is passed through them.

Referring back again to FIG. 1, the controller 42 receives a signal from an appropriate infrared emitter/detector combination 79 when the piston 28 has pushed the rehydrated material completely out the dough ring 310 past the base 314 and has completed its downward travel indicating that the first basket 30 has been filled and is ready to be moved. The controller then activates the transport motor of the chain transport system 94 for a time sufficient to move the first basket 30 from beneath the conveyor belt 88 to be immersed in the deep fryer 18. As the sprocket 102 is rotated, the chain 100 is moved along its travel path, moving the first basket into the deep fryer and bringing the second basket 31 out. As the first basket is immersed in the cooking oil, the chain path takes the second basket up out of the deep fryer and toward the shaft of a second chain sprocket 104. As the second basket reaches the top of its travel, the shaft catches on the top rim of the basket and tips the basket over as the chain continues to move, thereby spilling out the cooked food pieces. The cooked food pieces are spilled onto the delivery ramp 96, which ends at the food product container 20 at the side of the apparatus cabinet 12. Thus, the cooked load of food product is delivered to the customer.

The controller 42 operates the metering unit 22, the piston 28, the transport system 16, and all the other associated apparatus elements to cook in cycles having a predetermined number of basket loads. This ensures that an adequate quantity of cooked food products will be delivered to the customer with each order, and ensures that raw food material or cooked products will not be left behind in areas of the apparatus, such as the receiving cylinder 50, dough ring 310, or baskets 30 or 31. This increases the efficiency of the apparatus, and minimizes the potential for health and cleanliness problems. The controller can operate the apparatus, for example, such that two basket loads comprise a complete cycle. Because loading and rehydrating of the second basket can be carried out while the first basket load is being cooked, the controller can operate the system such that the cooked basket loads are separated in time by little more than the time it takes to cook a single basket load, improving efficiency.

It has been found that rehydration is more efficient, and that the formed pieces separate better from the cutting lines 86 and from each other, if the rehydrating water is heated to an elevated temperature. Therefore, the apparatus 10 advantageously includes a water heater 106 that heats the rehydration water before it is delivered to the rehydration shower assembly 26. The optimum temperature will vary according to characteristics of the particular food material being used and according to desired characteristics of the cooked food product being produced. A conventional resistive heating element can be used to heat the water, and can be controlled by a thermal sensing switch. In a further aspect of the invention, a fan 108 is provided to pull air over the hot water heater and into a duct 110. The air becomes heated and is then directed by the duct toward the areas of the apparatus where rehydration liquid might otherwise collect, and therefore where dehydrated food material could accumulate and become somewhat moist.

For example, under some circumstances moisture can be squeezed upwardly in the receiving cylinder 50 by the piston 28 and into the end of the material delivery ramp 48. The moisture can then cause food material to accumulate in the ramp rather than fall into the receiving cylinder and dough ring 310. This accumulated moisture and food material could cause imprecise delivery of material and could create an environment in which bacteria can grow, creating a potential health problem. The heated air maintains such areas in a dry condition, thereby minimizing any tendency for the food material to moisten and collect. This reduces health and sanitation problems, and using the hot water heater to provide the hot air is more efficient than providing a separate air heater.

The receiving cylinder 50 and piston 28 can also be kept cleaner and dryer with the help of a one-way valve 240 in the top surface of the cylinder (FIG. 6). The valve allows air to flow into the cylinder during the downward stroke of the piston, and also decreases the vacuum that would otherwise occur and thereby reduces the torque required to lower the piston. During the upward stroke of the piston, the valve does not allow air to flow out, forcing the air to flow down around the sides of the piston and out of the cylinder, including out the receiving port 52. This flow of air helps to blow out any extraneous food material and moisture, and helps to keep the area clean and discourage bacteria growth.

To prevent the dehydrated food material from caking against the sides of the reservoir 14, and to keep it flowing freely into the metering unit 22 and the dough ring 310, further improving the metering accuracy, the reservoir advantageously incorporates an agitator device 112 comprising a two-bladed propeller 114 mounted to the rotating shaft of a motor 116 located along the bottom of the reservoir, near the opening 44. At predetermined intervals, such as with every serving portion ordered via the keypad 38, the motor shaft is rotated for a predetermined time such that the agitator propeller blades break up any food material that has caked together to the sides of the reservoir. This ensures that the material remains in a crumbled, freely moving state, so that all of the material can be emptied from the reservoir, and improves the efficiency of operation of the metering device 22.

Figure 9:
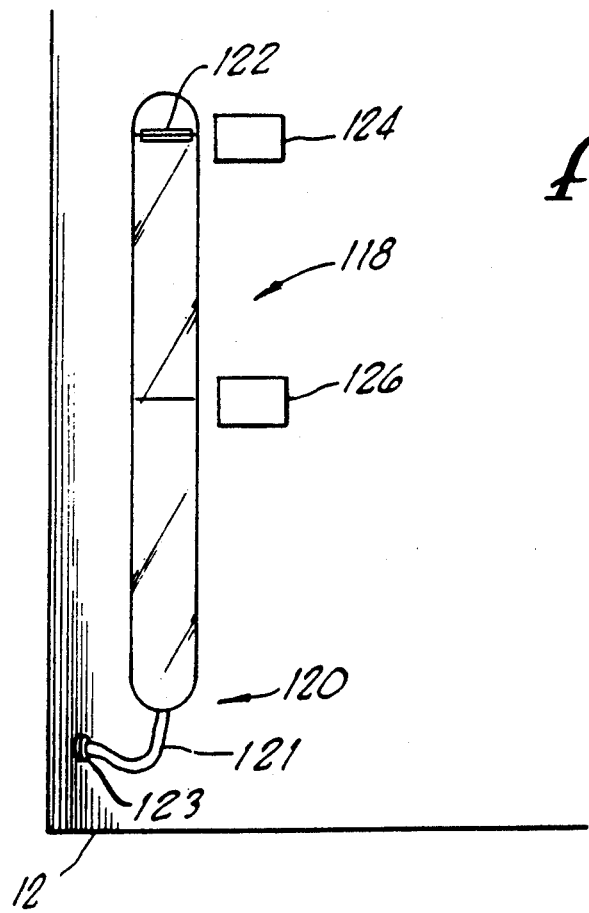
FIG. 9 is a view of a portion of the back board of the FIG. 1 device.

FIG. 9 is a view of a back side of the apparatus 10 opposite from that illustrated in FIG. 1, and shows a transparent water measuring cylinder 118 used to precisely measure out the amount of water necessary for a cycle of operation, i.e., two basket loads of food product. This ensures that the apparatus will not begin a cycle of operation without sufficient water for that complete cycle. Otherwise, the water could be depleted in the middle of the cycle and an error condition could therefore arise, stopping the operation and requiring detailed intervention by an attendant. At a bottom inlet end 120, the measuring cylinder is coupled by a hose 121 to the water tank 82 through a hole 123 in a bulkhead of the apparatus cabinet. A flat device 122 in the measuring cylinder indicates the top level of the water in the cylinder. After a cooking cycle has been completed, enough water is drawn into the measuring cylinder for the number of basket loads of food product required for a cycle, i.e., until the float reaches a predetermined level, as detected by an optical unit 124. The flow of water is then shut off from the tank 82.

After the water in the measuring cylinder 118 has reached the proper level, the water in the measuring cylinder is pumped into the water heater 106 until the float 122 reaches a second predetermined level, as detected by a second optical unit 126. This indicates that sufficient water is in the heater for a single basket load of food product. When the water in the water heater has been delivered to the shower unit 26, the remaining water in the measuring cylinder is delivered to the water heater. At the end of the next cooking cycle, the measuring cylinder is again filled, ready for the next cycle. Thus, the amount of water used is kept precisely controlled so that rehydration is consistent and accurately carried out.

If any of the supplies used by the apparatus 10 are exhausted, the controller 42 prevents the cooking operations from proceeding. For this purpose, the food material reservoir 14 includes an optical sensor 242 located above the reservoir opening 44. The sensor includes a light source, such as a light emitting diode (LED), and an optical detector. If dehydrated food material is present in the reservoir, the detector does not receive any light from the LED. When food material in the reservoir drops below the level of the sensor, the detector receives light from the LED and provides a signal to the controller, indicating that the supply of food material has been exhausted, whereupon the controller signals an error condition on the display 40 and disables the apparatus.

The water level in the tank 82 is also monitored by the controller 42. A float device 244 and associated optical sensor 246 similar to that described for the water cylinder 118 of FIG. 9 is used to monitor the water level in the tank. If the level drops below a predetermined minimum, the controller signals an error condition on the display 40 and disables the apparatus. A light source and optical detector combination 248 similar to that described for the reservoir 14 are also included in an oil line 250 that leads from the oil storage tank 89 to the deep fryer 18. When oil is present in the line, the detector receives little or no light. When oil is absent from that part of the line, the detector receives a greater amount of light and provides a signal to the controller, which then signals an error condition on the display and disables the apparatus 10.

Figure 10A:
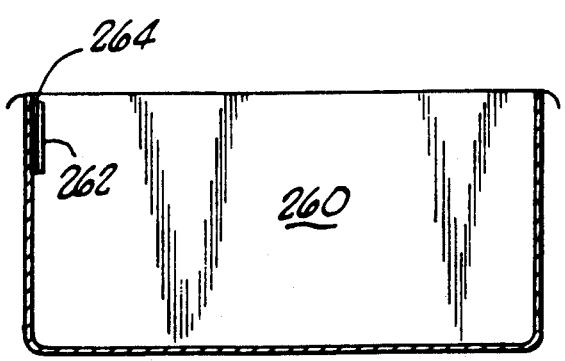
FIGS. 10a and 10b are elevational views of a capacitance oil level sensor for the deep fryer shown in the apparatus of FIG. 1.
Figure 10B:
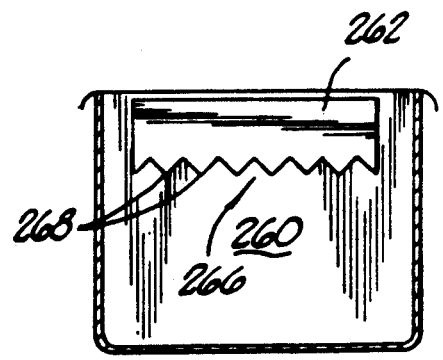

The level of cooking oil in the deep fryer 18 can be monitored by a capacitance-type sensor circuit. In particular, the deep fryer is shown in FIGS. 10a and 10b to include a metallic cooking tank 260 that contains the cooking oil, and further includes a thin metallic strip 262 that is oriented horizontally in the tank and is spaced away from the wall of the tank by small, thin insulating spacers 264. The capacitance between the thin metallic strip and the tank wall varies according to the level of oil in the cooking tank, and is measured by a circuit that provides a tank oil level output signal to the controller 42. Thus, the metallic strip and tank wall form the plates of a capacitor. When the oil level signal indicates that the level has fallen below a predetermined minimum, the controller causes additional oil to be pumped from the storage tank 89 to the cooking tank 260.

The relative level of cooking oil in the cooking tank 260 is not as important as simply knowing when the level falls below a minimum cooking level, and therefore oil should not remain on the strip as the tank level falls below the strip. The metallic strip 262 is advantageously provided with a sawtooth-shaped bottom edge 266 that facilitates the drainage of oil from the strip when the oil level drops below the strip by allowing oil to collect at the strip's teeth points 268 and more readily fall off the strip. In this way, oil will be discouraged from remaining on the strip and in contact with the oil just below it, which could produce a capacitance oil level signal that would erroneously indicate a higher level of oil in the cooking tank. This improves the accuracy of the level monitoring.

Control of objectionable odors is very important in meeting health codes in many locations, and is also important in gaining consumer acceptance of the apparatus. Therefore, the electrostatic filter 32 of the apparatus 10 is located above the deep fryer 18. The electrostatic filter includes a suction fan 130 that pulls outside air in through the serving port 43 or other suitable openings in the apparatus cabinet 12, past the deep fryer, and to a first particulate filter screen or element 132. The first particulate filter screen preferably comprises a spun steel wool or aluminum filter element or the like, and is used to trap relatively large airborne particles, including dust and airborne cooking oil.

After the air leaves the first particulate filter screen 132, small particles can still be present in the air stream and could potentially cause odors. Therefore, the air is next directed into a venturi formed by two opposed, curved surfaces 134 and 136. These curved surfaces gradually decrease the cross sectional area of air flow through the electrostatic filter down to approximately one inch. The curved surfaces are provided with a plurality of spaced project spikes, or pins 138, to which are applied an electrical charge. This ionizes the particles in the air, or gives them a charge, and they then quickly stick to the nearest surface that is not charged. A second spun steel wool filter element 140 is provided for this purpose immediately downstream of the ionizing pins. For maximum ionization of all particles, the pins on one curved surface are offset from the pins of the other curved surface. Thus, the pins are provided at approximately one-inch intervals on their respective curved surfaces and provide a substantially uniform ionization of the air flow. The one-inch spacing of the curved surfaces is enough to direct all the air to the pins for ionization, but is not so small that air velocity, and noise, are substantially increased. The fan 130 has a flow capacity of approximately 80 to 100 cubic feet per minute. With the fan and filter operating, the apparatus can operate with virtually no cooking odors.

Figure 11:
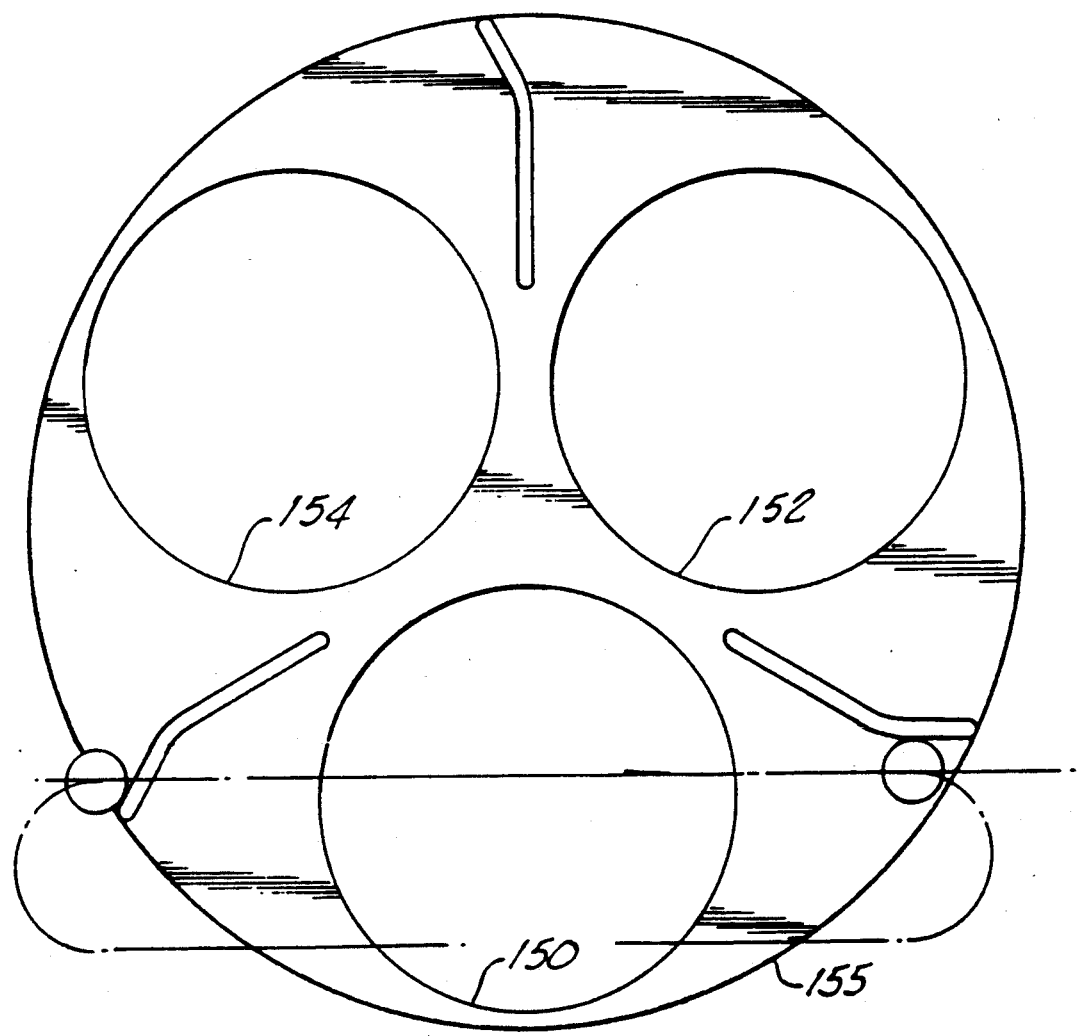
FIG. 11 is a plan view of a multiple holding cup arrangement for an apparatus of the type shown in FIG. 1.

In high use environments, where it is likely that many orders will be processed sequentially in a constant flow, it might be advisable to increase the frequency of delivering cooked food product orders. For such conditions, an alternative embodiment of the conveying assembly illustrated in FIG. 11 is desirable. The FIG. 11 apparatus incorporates a rotary tray design, in which three dough rings 150, 152, and 154 are arranged on a carousel 155 such that the centers of the three rings define a circle about whose center the rings are rotated. At any one time, a first ring will be at a loading station, receiving a load of food material as metered out by the metering unit 22, a second ring will be located at the rehydration shower assembly 26, receiving the rehydrating liquid, and a third dough ring will have already received a load of food product material, which will have already been rehydrated. The third dough ring will be positioned beneath the piston 28 for the forming operation, in which the rehydrated material is forced from the ring past the cutting wires, cutting the material into pieces of the desired size and shape.

It should be apparent that the FIG. 11 configuration results in an increased frequency of production. For example, instead of a load of cooked food product being delivered at the container 20 once every time the single dough ring 24 completes a sequence of travel from loading to rehydrating to forming, the three-cup configuration of FIG. 11 delivers a load of cooked food product three times during the same time interval. That is, cooked food product is delivered three times faster.

Figure 12:
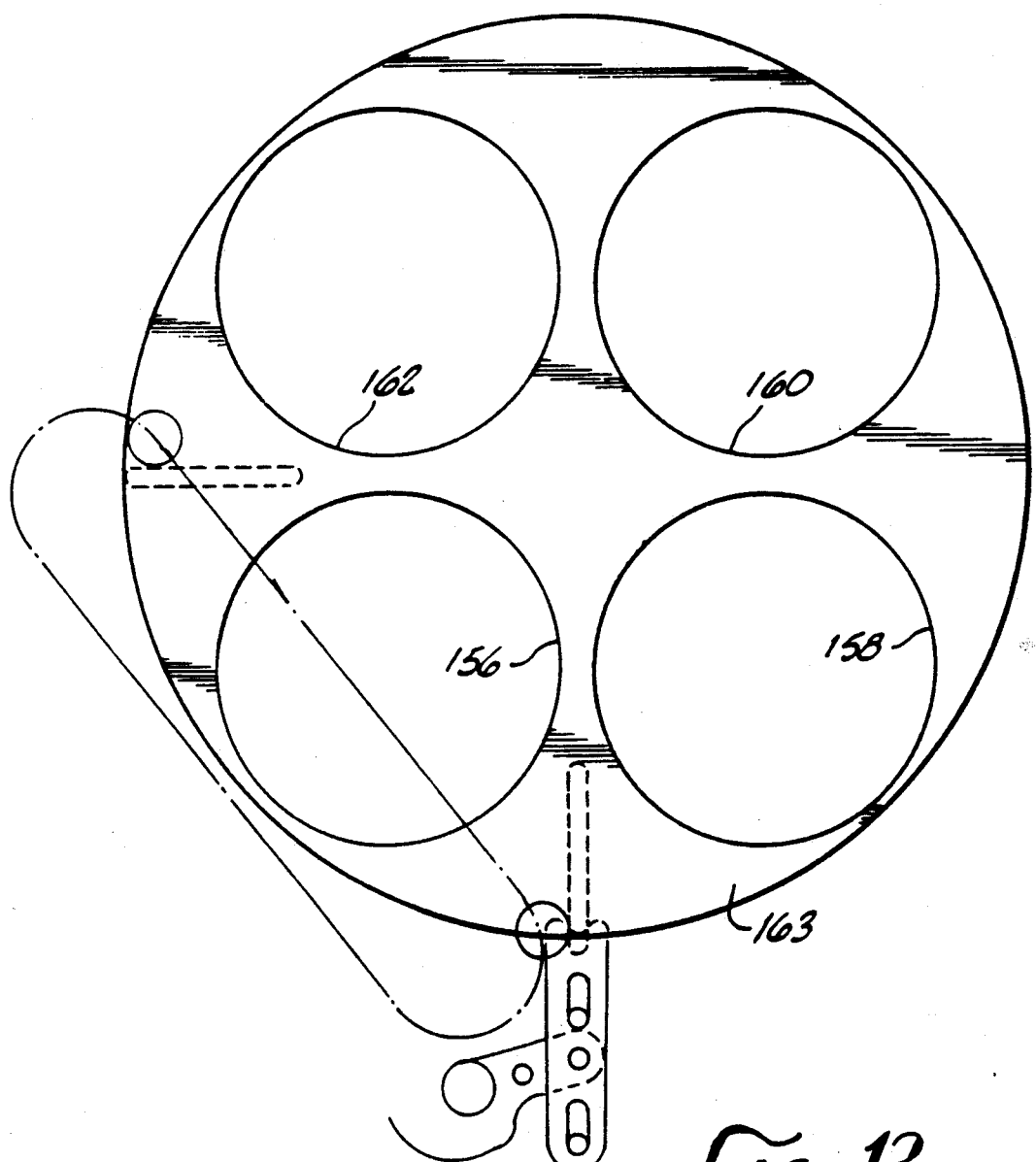
FIG. 12 is a plan view of another multiple holding cup arrangement for an apparatus of the type shown in FIG. 1.

In yet another embodiment of the present invention, illustrated in FIG. 12, a four-cup dough ring arrangement is shown. It should be appreciated that this configuration increases the frequency of cooked food product delivery beyond even the three-cup configuration of FIG. 11, and is preferred for environments that have an unusually high demand rate. In this configuration, four rings 156, 158, 160, and 162 are arranged on a carousel 163 in a circle and are rotated first through a loading position, then to a second position in which compressing and leveling takes place, to a third position for rehydration, and finally to a fourth position where the rehydrated material is pressed out of the ring and formed into pieces having the desired shapes and sizes. The FIG. 12 configuration provides an even greater increase in the frequency of food product delivery as compared with the FIG. 11 configuration.

Figure 13:
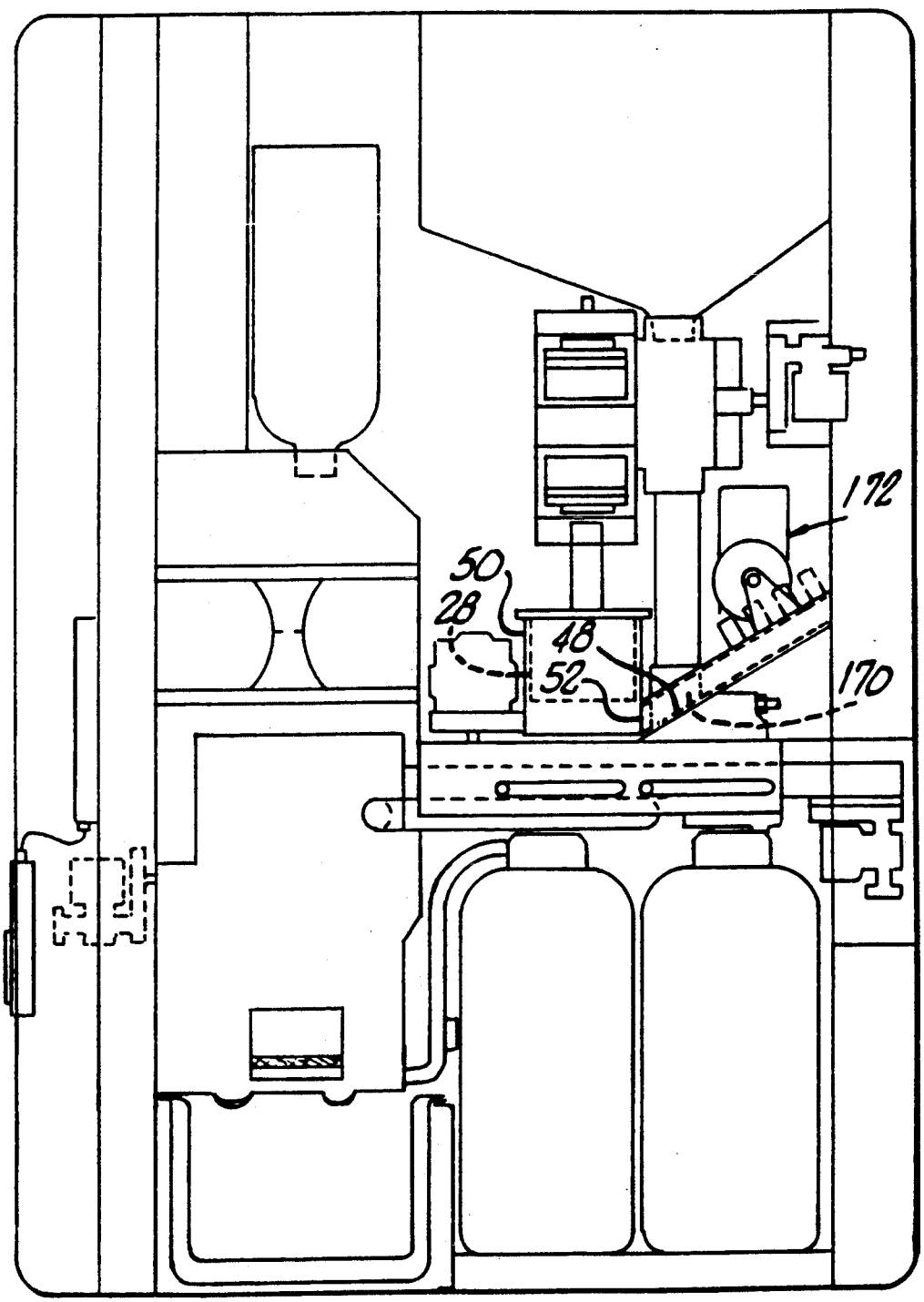
FIG. 13 is a side view of an apparatus of the type shown in FIG. 1, with a moving plug arrangement for controlling extraneous moisture.

As noted above, moisture that might otherwise be drawn into the raw material ramp 48 is kept out, and the ramp and receiving cylinder port 52 are kept substantially dry, by a stream of heated air directed at these areas. In an alternative embodiment illustrated in FIG. 13, a plug 170 is moved into and out of the receiving cylinder port instead. The plug is illustrated in a lowered position, but is ordinarily kept in a raised position at the upper end of the raw material ramp, and is preferably constructed from an injection molding technique to closely fit within the ramp and have an end that closely matches the receiving cylinder port 52. In operation, after the raw food material has fallen through the down tube 46, onto the raw material ramp 48, past the receiving cylinder port 52 and into the dough ring 310, the plug is moved down the ramp by a plug motor 172 and into the receiving cylinder port. Any moisture and extraneous raw food material that are in the ramp are forced downwardly by the moving plug and into the receiving cylinder 50. When the plug reaches the end of its travel, the plug fits substantially flush with the inside surface of the receiving cylinder and presents a smooth surface to the piston 28. When the piston is pushed against the rehydrated material, any moisture and food material pushed along by the plug are, in turn, pushed onto the food material in the dough ring by the piston. In this way, moisture and collected raw food material are cleaned out of the ramp area, and the smooth flow of material from the reservoir, down the ramp, and into the receiving cylinder is ensured.

Figure 14:
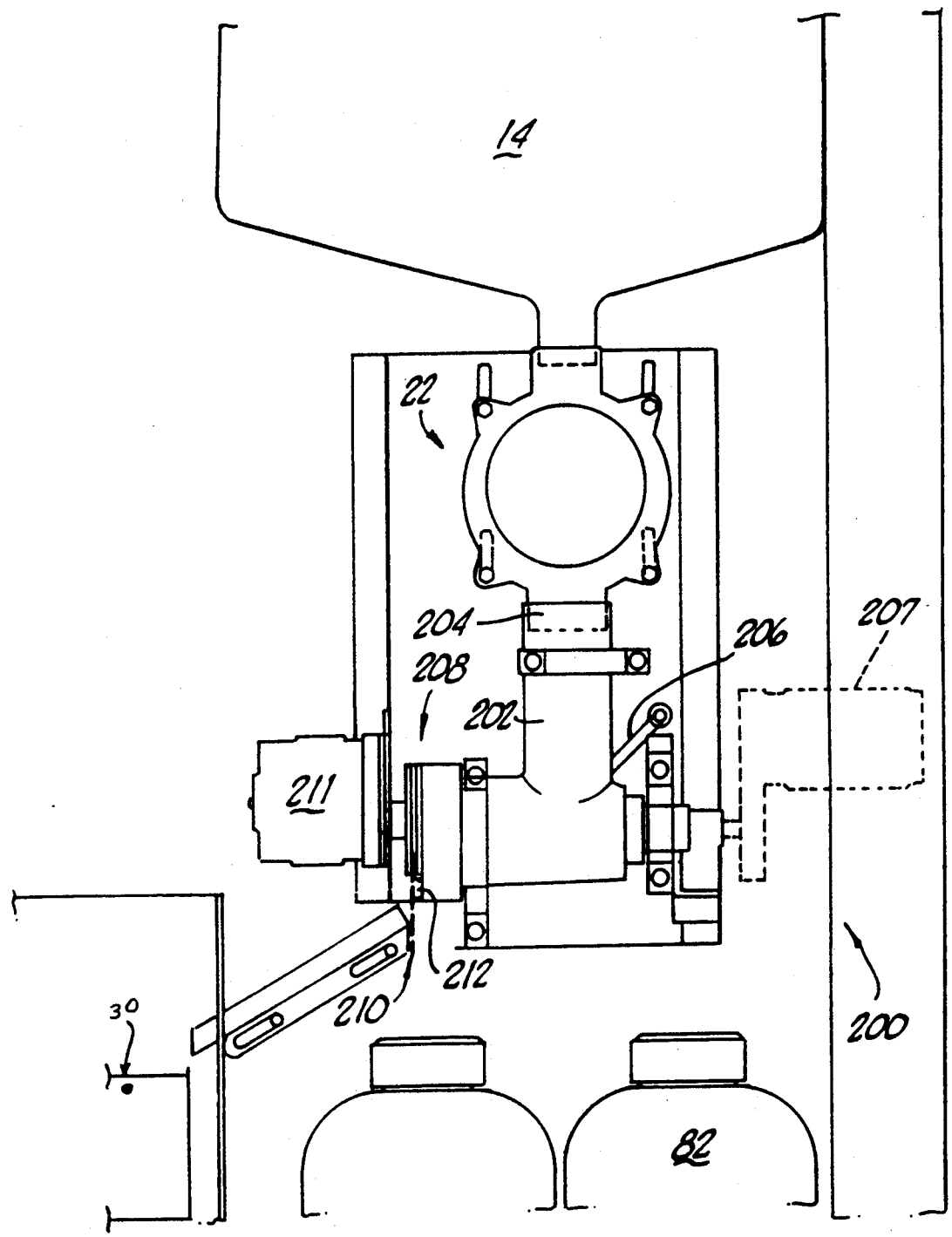
FIG. 14 is a side view of an auger-type device constructed in accordance with the present invention.

In yet another embodiment of the present invention, illustrated in FIG. 14, the forming assembly 24 is replaced with an auger-type device. The auger 200 includes a receiving hopper 202 with an open top placed adjacent a down tube 204. The raw material from the reservoir 14 is received into the hopper, and is rehydrated by a shower apparatus 206. The auger includes a screw that is rotated, mixing the raw food material and the rehydrating liquid while simultaneously carrying the mixture toward an emitting end 208 of the auger. At the emitting end, the rehydrated food material is extruded from the auger 200 and a rotating wire 210 slices off a desired length of rehydrated material. The sliced material falls into a cooking basket 30, which is then transported into a deep fryer 18, as described above.

The rotating wire 210 is preferably attached at one end to a rotating shaft and catches on a projection 212 until further rotation causes tension on the wire and it snaps free of the projection and is flicked through the mass of rehydrated food material. After passing through the material, the wire again catches on the projection, and the process is repeated. This arrangement is superior to conventional extrusion-type machines with cutting knives because the rotating wire is not sharp and cannot cut anyone working with it or otherwise become a safety hazard. The wire does not require sharpening and therefore is more reliable than cutting knives. The wire need only be selected to have the requisite stiffness to be flicked across the rehydrated material.

While the auger configuration of FIG. 14 might not be ideal for providing individual serving portions of cooked food product, because rehydrated material tends to solidify in the auger between orders, it has been found to be advantageous for the production of relatively large quantities of formed food product material. The auger configuration could be used, for example, without an accompanying deep fryer and could prepare food product pieces having the desired size and shape that are then frozen and packaged in a variety of serving portion sizes. A user could then select the number of pieces desired, and cook them at a later time.

The present invention provides a cooked food apparatus that quickly and efficiently meters dehydrated food material from a reservoir, compacts and levels it, rehydrates it into a food mass of uniform thickness and consistency, and then forms the rehydrated food into pieces of suitable size and shape. The forming operation simultaneously delivers the pieces into a first cooking basket that is moved along a chain drive into a hot oil deep fryer. This reduces the amount of time necessary to bring the food material from the reservoir to a state in which cooking is set to occur. A second basket is simultaneously moved out of the fryer and is automatically emptied as the first basket is moved into the fryer. Thus, no handling of the cooked food product is necessary before delivery to the customer. Cooking odors are substantially eliminated by an electrostatic filter having two spun steel wool elements separated by an ionization tunnel. The apparatus provides safe, clean, and sanitary operation.

The present invention has been described above in terms of presently preferred embodiments so that an understanding of the present invention can be conveyed. There are, however, many configurations for food cooking devices not specifically described herein, but with which the present invention is applicable. The present invention should therefore not be seen as limited to the particular embodiments described herein, but rather it should be understood that the present invention has wide applicability with respect to food cooking devices. Such other configurations can be achieved by those skilled in the art in view of the description herein.

We claim:

1. An apparatus for dispensing a cooked food product, comprising:
   reservoir means, for storing a quantity of dehydrated food material, having an outlet;
   material dispensing means for measuring out a predetermined amount of food material from the reservoir means;
   holding cup means for accepting food material from the material dispensing means and containing it therein in a product shape of predetermined thickness;
   rehydration means for adding a predetermined amount of liquid to the food material in the holding cup means and providing a rehydrated material;
   pressing means including forming means for forming the rehydrated food material, piston means for longitudinally moving a piston relative to the forming means to force the rehydrated food material from the holding cup means through the forming means, and means for laterally moving the piston relative to the forming means while the piston is engaged with the rehydrated material, to ensure dislodgement of the rehydrated material from the forming means and to provide a formed food material;
   transport means, including cooking means, for accepting the formed food material and for cooking it and providing a cooked food product;
   product dispensing means for emptying the transport means and dispensing the cooked food product; and
   control means for controlling the operation of the apparatus.

2. An apparatus as recited in claim 1, further comprising conveying means for moving the holding cup means from a position adjacent the material dispensing means to a position adjacent the rehydration means.

3. An apparatus as recited in claim 2, wherein the conveying means comprises a longitudinal track upon which the holding cup means slides.

4. An apparatus as recited in claim 1, wherein the reservoir means further includes agitator means for agitating the dehydrated food material stored in the reservoir means.

5. An apparatus as recited in claim 1, wherein the material dispensing means includes rotating drum means for accepting a predetermined amount of food material from the reservoir means and delivering it to the reservoir means outlet.

6. An apparatus as recited in claim 1, wherein the holding cup means comprises a circular dough ring and a sliding panel, located adjacent the bottom of the ring, that holds the food material in the ring.

7. An apparatus as recited in claim 6, wherein:
   the pressing means includes a plurality of cutting lines having longitudinal axes substantially perpendicular to the longitudinal movement of the piston;
   the longitudinal movement of the piston is in the vertical direction; and
   the piston has a circular periphery with a diameter slightly less than the internal diameter of the dough ring, and is adapted to be lowered into the ring and force the food material out the bottom of the ring as it is lowered.

8. An apparatus as recited in claim 7, wherein the pressing means includes means for rotating the piston about its longitudinal axis to effect the lateral movement.

9. An apparatus as recited in claim 8, wherein the pressing means includes a single motor coupled to a spin drive clutch assembly and vertical drive clutch assembly that produce the lateral and longitudinal movement, respectively, of the piston.

10. An apparatus as recited in claim 7, wherein the bottom of the piston includes a raised button that assists in dislodging the rehydrated food material from the cutting lines.

11. An apparatus as recited in claim 7, wherein the bottom of the piston is provided with a convex surface.

12. An apparatus as recited in claim 7, wherein the cutting lines comprise parallel, uniformly spaced wires.

13. An apparatus as recited in claim 7, wherein the cutting lines comprise heated wires.

14. An apparatus as recited in claim 1, wherein the holding cup means comprises a plurality of dough rings arranged in a carousel configuration, having a panel located adjacent the bottom of each dough ring that holds the food material therein.

15. An apparatus as recited in claim 1, wherein the rehydration means comprises a rotating, multiple-armed shower head having a plurality of spray nozzles.

16. An apparatus as recited in claim 1, wherein the transport means comprises a basket that accepts the preformed food material at a loading position, and carries it through a cooking area to the product dispensing means, and returns to the loading position to accept additional material.

17. An apparatus as recited in claim 16, wherein the product dispensing means comprises:
   a ramp that delivers the cooked food product to a dispensing outlet; and
   means for pivoting the basket as it moves out of the cooking area to empty it of the contents.

18. An apparatus as recited in claim 1, wherein the transport means comprises a first basket and a second basket that each accept the sliced food material, carry it to a cooking area, and return to a position to accept more material.

19. An apparatus as recited in claim 1, wherein the pressing means levels the food product material in the holding cup means before rehydration by the rehydrating means.

20. An apparatus as recited in claim 19, wherein the pressing means compacts the food material in the holding cup means before rehydration by the rehydrating means.

21. An apparatus as recited in claim 1, further including drying means for drying areas of the apparatus where food product material would otherwise absorb moisture and accumulate.

22. An apparatus as recited in claim 1, further including electrostatic filter means for circulating air through the apparatus and treating it electrostatically to remove objectionable odors.

23. An apparatus as recited in claim 1, further including optical sensor means for providing an empty signal to the control means when the reservoir means is empty of food material.

24. An apparatus for producing cooked food product from a dehydrated raw food material, comprising:
   a reservoir for containing the dehydrated raw food material;
   a metering cylinder in communication with the reservoir, for accepting a predetermined volume of raw food material;
   a holding cup movable along a tack between first and second positions, the holding cup having a bottom panel slidable between open and closed positions;
   a raw material ramp extending between the metering cylinder and the holding cup, when the holding cup is in the first position, for transferring the predetermined amount of material from the metering cylinder to the holding cup;
   cutting lines disposed beneath the holding cup, when the holding cup is in the first position, so as to be in contact with the raw food material, when the bottom panel is in the open position;
   a piston lowerable into the holding cup, when the holding cup is in the first position, the piston for leveling the raw material, when the bottom panel is in the closed position, and for forcing the raw material through the cutting lines, when the bottom panel is in the open position, to form the material;
   a rehydrating shower head disposed above the holding cup, when the holding cup is in the second position, for rehydrating the predetermined amount of material;
   at least one transport basket driven by a chain drive mechanism along a path between the collection and delivery position, the collection position adjacent the cutting lines, the collection positon for collecting the raw food material after the raw food material is forced through the cutting lines, and the delivery position adjacent a delivery ramp, the delivery position for emptying the contents of the transport basket onto the delivery ramp;
   a deep fryer for containing a predetermined amount of heated cooking oil, the deep fryer disposed along the path between the collection and delivery positions; and
   control means for controlling the movement of the various elements.

25. An apparatus as recited in claim 24, wherein the cutting lines comprise a plurality of parallel, spaced apart wires.

* * * * *